United States Patent [19]

Bohlmann

[11] 4,444,151

[45] Apr. 24, 1984

[54] SWINE FEEDING APPARATUS

[76] Inventor: Orville R. Bohlmann, Bohlmann, Inc., P.O. Box 369, Denison, Iowa 51442

[21] Appl. No.: 390,302

[22] Filed: Jun. 21, 1982

[51] Int. Cl.³ .............................................. A01K 5/00
[52] U.S. Cl. ..................................... 119/53.5; 119/54
[58] Field of Search ............................... 119/53.5, 54

[56] References Cited

U.S. PATENT DOCUMENTS

| | | | |
|---|---|---|---|
| 1,695,597 | 12/1928 | Lydon | 119/54 |
| 2,484,967 | 10/1949 | Sodders | 119/54 |
| 2,512,260 | 6/1950 | Powell | 119/53.5 |
| 2,640,464 | 6/1953 | Jindrich | 119/54 |
| 3,203,703 | 8/1965 | van der Lely et al. | 222/228 X |
| 3,613,641 | 10/1971 | Geerlings | 119/51.11 |
| 4,147,132 | 4/1979 | Gilst | 119/53 |
| 4,246,678 | 1/1981 | Cunningham | 119/54 |
| 4,385,591 | 5/1983 | Petersen | 119/54 |

Primary Examiner—Hugh R. Chamblee
Attorney, Agent, or Firm—Henderson & Sturm

[57] ABSTRACT

An improved swine feeding apparatus of the type having a feed storage unit (11) operably connected to a feed receiving and dispensing trough unit (16). The improvements include an interior feed retaining wall (41) to assist in maintaining all feed within access of a feeding swine. The improvements further includes an improved agitator unit (17) whereby a swine operated agitator member (49) may rotate and pivot freely to agitate feed. Finally, the invention includes an improved feed gate unit (18) wherein the threaded connection between the feed gate shaft (29) and the crank handle (32) is protected against contact with the feed.

5 Claims, 7 Drawing Figures

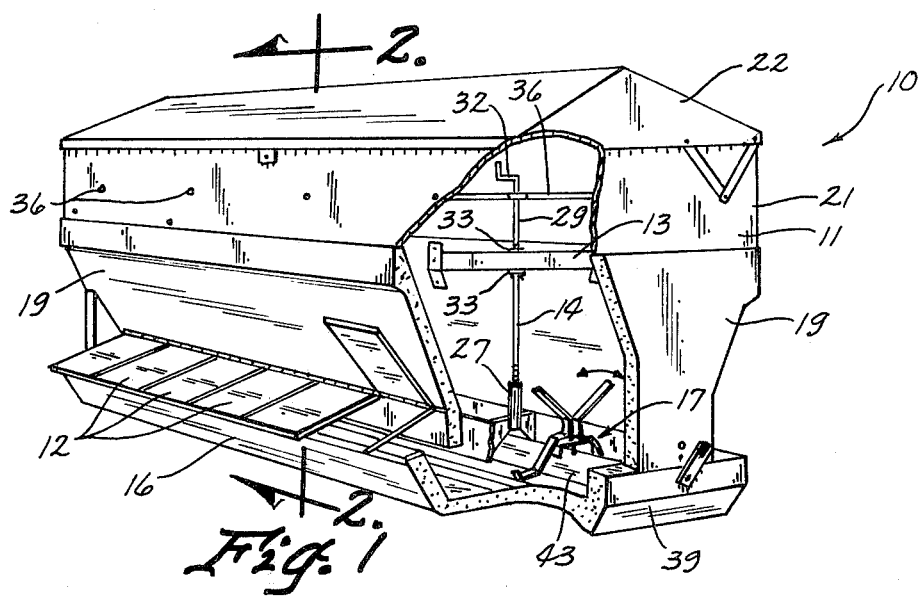
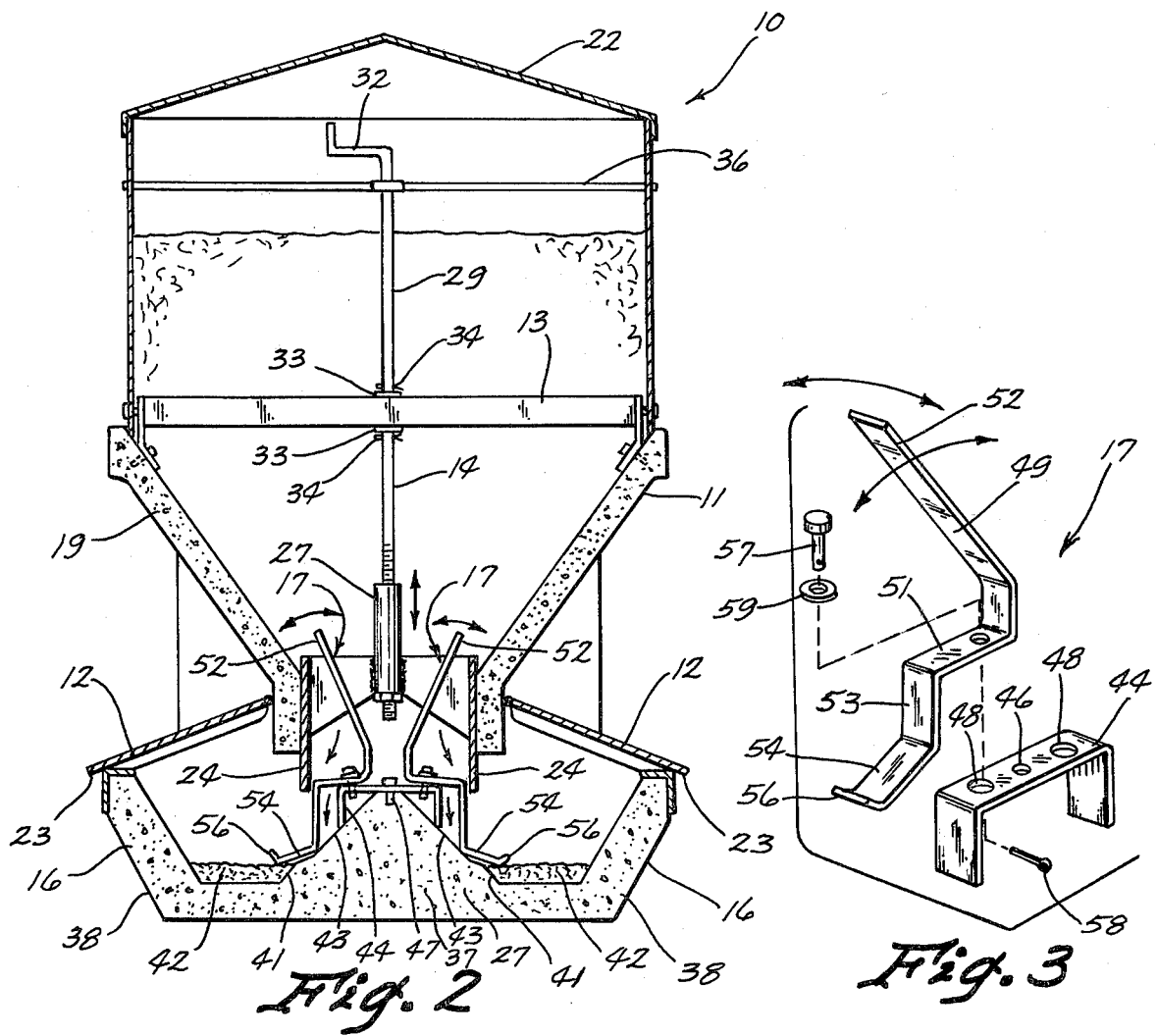

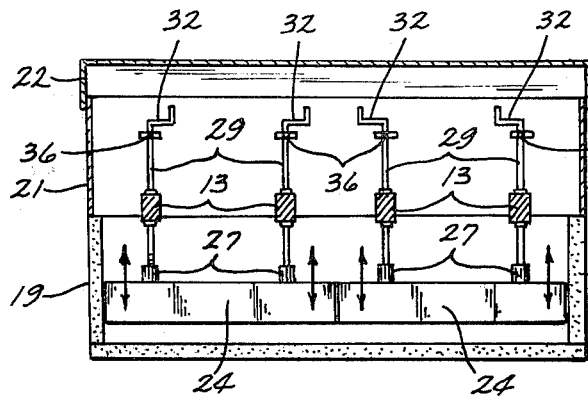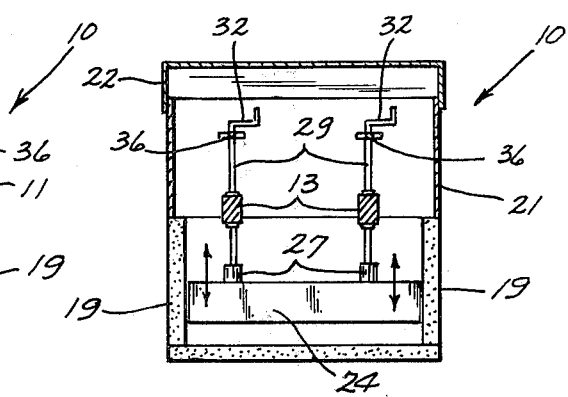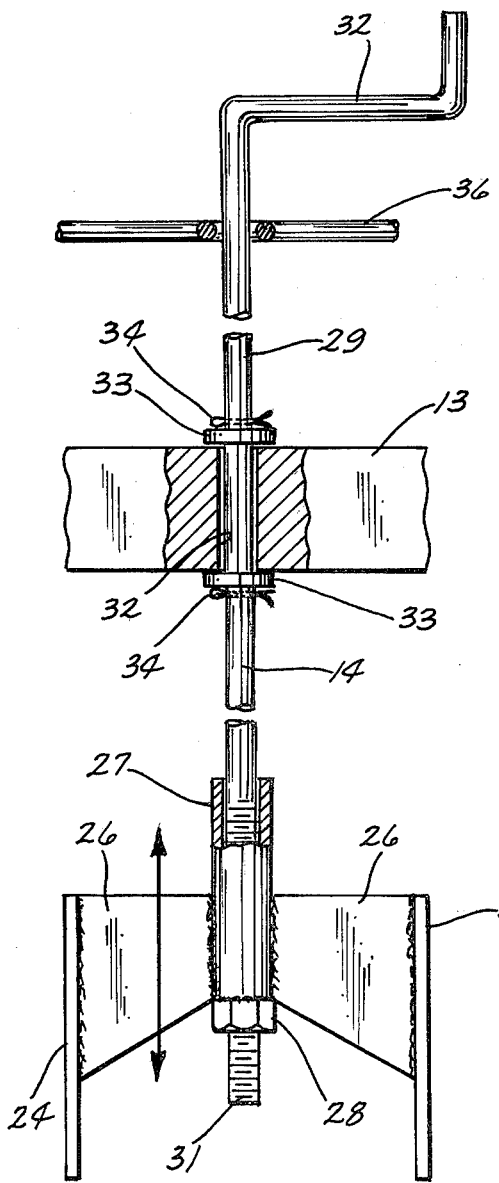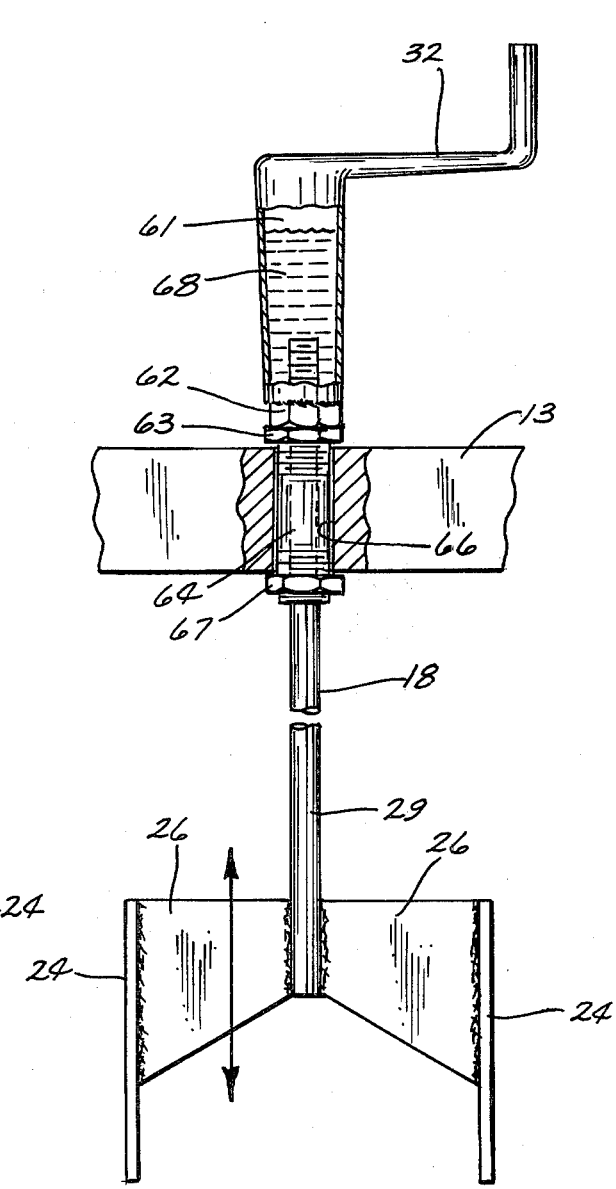

4,444,151

SWINE FEEDING APPARATUS

TECHNICAL FIELD

This invention relates generally to swine feeding apparatus.

BACKGROUND ART

Many different types of hog feeding equipment are known in the prior art. One common variety generally includes a feed storage unit disposed above a feed receiving and dispensing trough unit. So configured, a quantity of feed may be disposed and stored within the feed storage unit. Gravity will urge the feed down into the feed receiving and dispensing trough unit. One or more swine may then feed from the trough unit.

To control the rate of feed dispensation from the feed storage unit to the trough unit, many such units include a feed gate mechanism. Such feed gate mechanisms typically include a vertically disposed shaft and crank. By manipulating the crank, the feed gate may be positioned to selectively control the size of the opening between the feed storage unit and the trough unit.

Many such swine feeding mechanisms also include agitators disposed within the grain storage unit, the trough unit or both. In general, such agitators serve to agitate the feed and assure its availability for the feeding swine. Such agitators may be either operator or swine controlled.

The applicant has determined that certain problems and inefficiencies exit with respect to these prior art swine feeding mechanisms. For instance, feed can be pushed back into the trough unit and become inaccessible to the swine. Such nonaccessible feed poses obvious problems of economy and sanitation. Such swine feeding apparatus should preferably operate to cycle all of the grain contained therein to the swine.

In addition, prior art agitators do not provide sufficient movement to adequately agitate the feed. In particular, swine operated agitators are typically circumscribed by limited mobility and hence have limited ability to agitate.

Finally, feed gate mechanisms are typically operated via threaded connections between the feed gate and the control shaft. Feed particles can invade this threaded region and cause difficult operation.

DISCLOSURE OF INVENTION

These and other problems are avoided by use of an improved swine feeding apparatus having an improved feed receiving and dispensing trough unit, an improved agitator unit, and an improved feed gate unit.

The improved feed receiving and dispensing trough unit includes a base member for resting upon the ground and an exterior feed retaining wall connected to the base member. Both of these elements are common to the prior art. The improved trough unit, however, additionally includes an interior feed retaining wall connected to the base member. This interior feed retaining wall serves to assist in positioning feed within reach of feeding swine. An inclined feed delivery surface may be positioned proximal the interior feed retaining wall to further urge grain towards an area accessible to the swine.

The improved agitator unit includes an agitator base connected to the base member of the trough unit. One or more agitator members may then be connected via a pivot member to the agitator base. The agitator member itself includes a stored feed agitation arm for disposition within the feed storage unit, a dispensing port agitation arm for disposition between the feed gate unit and the base member of the trough unit, and a dispensed feed agitation arm for disposition within the trough unit. In addition, the dispensed feed agitation arm includes a control surface for operable interaction with a swine's snout.

The pivot member may be disposed trough both the agitator member and the agitator base. The agitator member may freely rotate about the pivot member, and the pivot member may freely pivot about the agitator base. As a result, the agitator member has wide mobility with respect to the agitator base and thereby contributes to efficient and effective agitation of feed.

Finally, the improved feed gate unit includes a feed gate having a threaded shaft affixed thereto. The threaded shaft is threadably connected to an interior threaded crank handle. If desired, the crank handle may have a reservoir of lubricant disposed therein to further ensure smooth operation of the feed gate unit. Finally, a sleeve protects the threads of the feed gate shaft from coming in contact with the feed material.

BRIEF DESCRIPTION OF THE DRAWINGS

These and other attributes of the invention will become more clear upon a thorough study of the following disclosure of the best mode for carrying out the invention, particularly when reviewed in conjunction with the drawings, wherein:

FIG. 1 is a reduced perspective view of the improved swine feeding apparatus;

FIG. 2 is a side elevational sectioned view of the swine feeding apparatus along the plane indicated in FIG. 1;

FIG. 3 is an exploded enlarged perspective view of the improved agitator unit;

FIG. 4 is a reduced front elevational cutaway view of the improved swine feeding apparatus;

FIG. 5 is another embodiment of the apparatus depicted in FIG. 4;

FIG. 6 is an enlarged partially cut away side elevational detailed view of a feed gate unit; and FIG. 7 is an enlarged partially cut away side elevational detailed view of an improved feed gate unit.

BEST MODE FOR CARRYING OUT THE INVENTION

Referring now to the drawings and in particular to FIG. 1, the apparatus of the invention may be seen as generally denoted by the numeral 10. Certain prior art elements depicted in FIG. 1 include a feed storage unit (11), a plurality of hinged feed lids (12), a plurality of feed storage unit brace members (13) and a feed gate unit (14). The apparatus (10) also includes an improved feed receiving and dispensing trough unit (16), an improved agitator unit (17) and an improved feed gate unit (18) (FIG. 7). These components will now be described in seriatim fashion.

The feed storage unit (11) will typically be comprised of an all concrete lower section (19). Often, this concrete lower section (19) will have a funnel-shaped interior when viewed in cross section (see FIG. 2). To increase capacity, galvanized steel pin walls (21) may be attached to the concrete lower section (19). Finally, to prevent precipitation and contaminants from infiltrating the feed, a galvanized steel roof (22) may be hingably attached atop the feed storage unit (11).

To provide support to the feed storage unit (19), a plurality of feed storage unit brace members (13) may be disposed laterally within the feed storage unit and connected thereto by bolts or other appropriate fastening means.

A plurality of hinged feed lids may be connected to the feed storage unit (19) as depicted. Such lids (12) may be made of galvanized steel and typically include a lip or overhanging section (23) (FIG. 2) such that a swine wishing to feed at the apparatus (10) may manipulate and raise the lid (12) with its snout and thereby gain access to the feed.

Referring to FIG. 6, a standard feed gate unit includes one or more feed gates (24) attached via a feed gate support arm (26) to a sleeve (27). The sleeve (27) has a nut (28) connected at one end thereof.

The feed gate unit (14) further includes a shaft (29) having one end (31) that is threaded and a second end having a crank handle (32) formed thereon.

A hole (32) may be disposed through the feed storage unit brace member (13) and the feed gate unit shaft (29) may be disposed therethrough. In order to preserve the position of the shaft (29) with respect to the brace member (13), a pair of washers (33) may be disposed about the shaft (29) on either side of the brace member (13) and held in place by cotter pins (34) or the like.

In order to provide additional lateral support for the feed gate unit (14), a crank brace (36) may be disposed about the feed gate shaft (29) proximal the crank handle (32) and attached by any appropriate means within the feed storage unit (11).

Referring now to FIG. 4, it will be appreciated that the feed gate (24) comprises a rectangular plate that extends the length of the feed storage unit (11). With reference to FIG. 2, it will be seen that the feed gate (24) further fits into the space between the feed storage unit (11) and the feed receiving and dispensing trough unit (16).

By rotating the crank handle (32), the two feed gates (24) can be made to move vertically up or down. By moving the gates (24) downwardly, the opening between the feed storage unit (11) and the trough unit (16) will become smaller, and the flow of feed will be slowed. Conversely, upon raising the feed gates (24), the opening between the feed storage unit (11) and the trough unit (16) will be made larger and feed may flow more readily.

The improved feed receiving and dispensing trough unit (16) will now be disclosed with reference to FIGS. 1 and 2. The improved trough unit (16) includes generally a base member (37) having exterior feed retaining walls (38) connected longitudinally thereto on either side of the base member (37). Side walls (39) are positioned at either end of the trough unit (16).

An interior feed retaining wall (41) also connects to the base member (37) in opposition to the exterior feed retaining walls (38). It will be noted that the exterior feed retaining walls (38) slope outwardly from the trough unit (16) and that the interior feed retaining walls (41) slope in the opposite direction. It should further be noted that the interior feed retaining wall (41) has been positioned within reach of a feeding swine. By so positioning the interior feed retaining wall (41), all of the feed (42) that becomes positioned between the interior feed retaining wall (41) and the exterior feed retaining wall (38) will be accessible to the feeding animals.

The base member (37) may also include an inclined feed delivery surface (43) such that feed dispensed from the feed storage unit (11) will continue to move along the feed delivery surface (53) into the trough unit (16). The provision of such a feed delivery surface (43) further assures that all feed placed within the feed storage unit (11) will be available to feeding swine, and that none of the feed will become inaccessible and therefore give rise to the problems associated with that condition.

The entire feed receiving and dispensing trough unit (16) may be comprised of an integral structure formed of concrete. Other materials could be used as well to obtain these benefits, but concrete has been determined to work very well in this application.

Referring now to FIGS. 2 and 3, the improved agitator unit (17) will now be described in detail.

The agitator unit (17) includes an agitator base (44). The agitator base (44) may be formed of a substantially U-shaped steel member having a hole (46) disposed therethrough to facilitate attachment of the agitator base (44) to the base member (37) of the trough unit (16). Such attachment may be by bolt (47) or other appropriate fastening means. The agitator base (44) also includes a pair of pivot holes (48) that are disposed therethrough on either side of the mounting hole (46). The purpose of these pivot holes (48) will be made more apparent below.

Each agitator unit (17) further includes a pair of agitator members (49). Since both agitator members (49) are identical, only one need be described in detail here. The agitator member (49) includes a base plate (51) to facilitate attachment of the agitator member (49) to the agitator base (44). A stored feed agitator arm (52) connects to the base plate (51) and may be disposed somewhat vertically with respect thereto. A dispensing port agitator arm (53) may be connected to the opposite side of the base plate (51) and may be disposed in the opposite direction of the stored feed agitator arm (52).

A dispensed feed agitator arm (54) may be connected to the dispensing port agitator arm (53). Finally, a control surface (56) may be connected to the dispensed feed agitator arm (54) for operable engagement with the snout of a feeding animal.

The base plate (51) of the agitator member (49) has a hole disposed therethrough. A pivot member (57) may then be disposed through the hole in the base plate (51) of the agitator member (49) and through the pivot hole (48) provided therefore in the agitator base (44). A cotter key (58) or other suitable attachment device may then be connected through the pivot member (57) to retain the pivot member in this relative position. If desired, a washer (59) or the like may be disposed between the pivot member (57) and the agitator arm (49).

The hole disposed through the agitator arm (49) should be of sufficient size to allow the agitator member (49) to freely rotate about the pivot member (57). The hole through the agitator base (48) should be of a somewhat larger size to enable the pivot member (57) to pivot therein. So provided, the agitator member (49) may freely rotate about the pivot member (57) and it may also pivot with general freedom with respect to the agitator base (44).

Referring now in particular to FIG. 2, it will be appreciated that the stored feed agitator arm (52) extends up within the feed storage unit (11). Upon causing the agitator member (49) to rotate and pivot with respect to the agitator base (44), the stored feed agitator arm (52) will agitate feed within the feed storage unit (11). Similarly, the dispensing port agitator arm (53) will agitate feed located within the dispensing port located between the feed storage unit (11) and the trough unit (16). Finally, the dispensed feed agitator arm (54) will assist in agitating feed on the feed delivery surface (43) and within the trough unit (16) itself.

The control surface (56) protrudes within the trough unit (16) so as to be positioned between the interior feed retaining wall (41) and the exterior feed retaining wall (38). This makes the control surface (56) accessible to the manipulation of a feeding animal's snout. Therefore, while feeding, the animal will cause the agitator member (49) to rotate and pivot with respect to the agitator base (44). This in turn will cause agitation of feed within the lower section of the feed storage unit (11), within the dispensing port, and within the trough unit (16) itself. Such agitation will ensure an adequate delivery of feed to the trough unit (16).

In general, one such agitator unit (17) will be provided for each feeding station.

Referring now to FIG. 7, an improved feed gate unit (18) will be described.

Like a standard feed gate unit (14), the improved feed gate unit (18) includes a pair of feed gates (24) that are each connected to a separate feed gate support arm (26). Rather than connecting the feed plate support arms (26) to a sleeve (27), however, in the improved feed gate unit (18) the support arms (26) attach directly to the feed gate shaft (29).

The crank handle (32) of the improved feed gate unit (18) includes a hollow interior (61). A first nut (62) may then be welded to the shaft end of the handle (32). This nut (62) should have interior threads for threadably receiving the threaded end of the feed gate shaft (29). A second nut (63) should then be welded to the first nut (62). This second nut (63) has a larger threaded opening to receive an exterior threaded sleeve (64). This exterior threaded sleeve (64) may then be disposed through a hole (66) provided therefore in the brace member (13).

Finally, a third nut (67) substantially identical to the second nut (63) may be threadably engaged with the threaded sleeve (64) to retain the crank handle unit (32) in this relative position with respect to the brace member (13). More particularly, the crank handle (32) may be rotated with respect to the brace member (13) but the crank handle (32) may not be moved vertically with respect to the brace member (13).

If desired, a lubricant (68) may be disposed within the hollow crank handle (32). This will facilitate ease of operation.

It will be appreciated that by rotating the crank handle (32), the feed gate (24) will be maneuverable up or down as with the standard feed gate unit (14). Unlike the standard feed gate unit (14), however, the threads on the feed gate shaft (29) will not be exposed to feed particles in the improved feed gate unit (18). Therefore, the improved feed gate (18) will not be as susceptable to difficulty of operation or failure.

Obviously, many modifications and variations of the present invention are possible in light of the above techings. It is therefore to be understood that, within the scope of the appended claims, the invention may be practiced otherwise than as specifically described.

I claim:

1. An improved swine feeding apparatus of the type having a feed storage unit operably connected to a feed receiving and dispensing trough unit, the improvement including at least one agitator unit, comprising:

(a) an agitator base connected to said feed receiving and dispensing trough unit;
   (b) an agitator member having a first end disposed within said feed storage unit and a second end rigidly attached to the first end thereof and disposed within said feed receiving and dispensing trough;
   (c) a pivot member rotatably connected to said agitator member and pivotably connected to said agitator base; such that said agitator member may rotate about said pivot member and said pivot member may pivot with respect to said agaitator base.

2. An improved swine feeding apparatus of the type having feed storage unit operably connected to a feed receiving and dispensing trough unit and further having a feed gate unit connected by a shaft to a crank handle, the improvement comprising a feed gate unit having:

(a) at least one feed gate;
   (b) a feed gate shaft non-rotatably affixed to said feed gate and having at least one threaded end;
   (c) a crank handle having interior threads for threaded attachment to said feed gate shaft, said crank handle having lubricant disposed therein for operable interaction with the threaded end of said feed gate shaft and the interior threads of crank handle, a sleeve disposed about the threaded end of said feed gate shaft to shield said threads from feed contained within said feed storage unit, and means for sealing said lubricant in said sleeve for lubricating said threads.

3. An improved swine feeding apparatus of the type having a feed storage unit operably connected to a feed receiving and dispensing trough unit and further having a feed gate unit connected by a shaft to a crank handle, the improvement comprising:

(a) a feed receiving and dispensing trough unit having:
      (i) a base member;
      (ii) an exterior feed retaining wall disposed proximal to said base member; and
      (iii) an interior feed retaining wall disposed proximal to said base member and distal said first feed retaining wall, such that substantially all feed disposed between said exterior and interior feed retaining walls is readily accessible to feeding swine;
   (b) a feed gate unit having:
      (i) at least one feed gage;
      (ii) a feed shaft non-rotatably affixed to said feed gage and having at least one threaded end;
      (iii) a crank handle having interior threads for threaded attachment to said feed gate shaft;
   (c) at least one agitator unit comprising:
      (i) an agitator base connected to said feed receiving and dispensing trough unit;
      (ii) an agitator member having a first end disposed within said feed storage unit and a second end connected rigidly to the first end thereof and disposed within said feed receiving and dispensing trough;
      (iii) a pivot member rotatably connected to said agitator member and pivotably connected to said agitator base member, such that said agitator member may rotate about said pivot member and said pivot member may pivot with respect to said agitator base member.

4. An improved swine feeding apparatus of the type having a feed storage unit operably connected to a feed receiving and dispensing trough unit, the improvement including at least one agitator unit, comprising:
(a) an agitator base connected to said feed receiving and dispensing trough unit;
(b) an agitator member having a first end disposed within said feed storage unit and a second end rigidly attached to the first end thereof and disposed within said feed receiving and dispensing trough;
(c) means for rotatably and pivotally connecting said agitator member to said agitator base whereby said agitator member may rotate and pivot with respect to said agitator base.

5. The apparatus of claim 4 wherein the axis of rotation of said agitator member is substantially vertical and the axis of pivoting of said agitator member is substantially horizontal.

* * * * *

UNITED STATES PATENT AND TRADEMARK OFFICE
CERTIFICATE OF CORRECTION

PATENT NO. : 4,444,151
DATED : April 24, 1984
INVENTOR(S) : Orville R. Bohlmann

It is certified that error appears in the above-identified patent and that said Letters Patent are hereby corrected as shown below:

In Column 1, line 31, please change --exit-- to "exist".

In Column 2, line 9, please change --trough-- to "through".

In Column 4, line 4, please change --(53) to "(43)".

Signed and Sealed this

Thirteenth Day of November 1984

[SEAL]

Attest:

GERALD J. MOSSINGHOFF

*Attesting Officer*   *Commissioner of Patents and Trademarks*

UNITED STATES PATENT AND TRADEMARK OFFICE
CERTIFICATE OF CORRECTION

PATENT NO. : 4,444,151

DATED : April 24, 1984

INVENTOR(S) : Orville R. Bohlmann

It is certified that error appears in the above-identified patent and that said Letters Patent are hereby corrected as shown below:

In Claim 3, line 48, please change --gage-- to "gate";
line 50, please change --gage-- to "gate".

Signed and Sealed this

Twenty-sixth Day of February 1985

[SEAL]

Attest:

DONALD J. QUIGG

Attesting Officer

Acting Commissioner of Patents and Trademarks